(12) United States Patent
Hering et al.

(10) Patent No.: US 7,698,033 B2
(45) Date of Patent: Apr. 13, 2010

(54) METHOD FOR REALIZING A PREFERRED IN-VEHICLE CHIME

(75) Inventors: Carl J. Hering, Farmington Hills, MI (US); Nathan D. Ampunan, Novi, MI (US)

(73) Assignee: General Motors LLC, Detroit, MI (US)

( * ) Notice: Subject to any disclaimer, the term of this patent is extended or adjusted under 35 U.S.C. 154(b) by 550 days.

(21) Appl. No.: 11/402,532

(22) Filed: Apr. 12, 2006

(65) Prior Publication Data

US 2007/0244615 A1   Oct. 18, 2007

(51) Int. Cl.
*G06F 19/00* (2006.01)
(52) U.S. Cl. .......................................... 701/36; 340/438
(58) Field of Classification Search ........................ None
See application file for complete search history.

(56) References Cited

U.S. PATENT DOCUMENTS

| | | | |
|---|---|---|---|
| 4,565,991 A * | 1/1986 | Lupoli et al. ................ | 340/438 |
| 6,429,773 B1 * | 8/2002 | Schuyler ................... | 340/425.5 |
| 6,856,820 B1 * | 2/2005 | Kolls ....................... | 455/575.9 |
| 7,170,400 B2 * | 1/2007 | Cowelchuk et al. ......... | 340/438 |
| 7,221,266 B2 * | 5/2007 | Cowelchuk et al. ......... | 340/460 |
| 2003/0152088 A1 * | 8/2003 | Kominami et al. .......... | 370/401 |
| 2003/0220722 A1 * | 11/2003 | Toba et al. .................... | 701/1 |
| 2004/0044454 A1 * | 3/2004 | Ross et al. .................... | 701/33 |
| 2005/0267647 A1 | 12/2005 | Kamdar et al. | |

* cited by examiner

*Primary Examiner*—Michael J. Zanelli
(74) *Attorney, Agent, or Firm*—Dierker & Associates, P.C.

(57) ABSTRACT

A method of realizing a preferred in-vehicle chime includes the steps of selecting the preferred in-vehicle chime from an Internet-enabled program or a call center, transmitting the preferred in-vehicle chime from the Internet-enabled program to a telematics unit operatively disposed within the vehicle, and transmitting the preferred in-vehicle chime from the telematics unit to a vehicle chime module disposed within the vehicle.

21 Claims, 2 Drawing Sheets

METHOD FOR REALIZING A PREFERRED IN-VEHICLE CHIME

TECHNICAL FIELD

The present disclosure relates generally to vehicles, and more particularly to realizing preferred in-vehicle chimes.

BACKGROUND

Many vehicles are fitted with chime modules, which provide a notification chime to alert a vehicle user/operator of any of a multitude of vehicle settings, operations, and/or conditions. A chime module may alert a vehicle user to the fact that a key is in the ignition after the vehicle is off, the headlamps are on after the vehicle is off, a door is ajar, a safety restraint should be enabled, the fuel level is low, an object is in the path of the vehicle, a device has been selected or a button on a device pushed, and/or the like.

A chime module typically uses a standard, factory-installed tone to alert a user. For example, a standard, factory-installed tone may be "dong," "ding," or "ding-dong." Current chime modules generally cannot be personalized or altered. Thus, the user may succumb to the pre-existing vehicle chime or replaces the entire chime module to change the sound of the in-vehicle chime.

As such, it would be desirable to provide an alterable and/or personalizable in-vehicle chime(s), and a method for altering and/or personalizing the chime(s) of a chime module.

SUMMARY

A method of realizing a preferred in-vehicle chime includes the steps of selecting the preferred in-vehicle chime from an Internet-enabled program, transmitting the preferred in-vehicle chime from the Internet-enabled program to a telematics unit operatively disposed within the vehicle, and transmitting the preferred in-vehicle chime from the telematics unit to a vehicle chime module operatively disposed within the vehicle.

BRIEF DESCRIPTION OF THE DRAWINGS

Objects, features and advantages of embodiments of the present disclosure may become apparent by reference to the following detailed description and drawings, in which.

DETAILED DESCRIPTION OF THE EMBODIMENTS

Embodiments of the method and system disclosed herein advantageously allow a vehicle user/operator to select preferable vehicle chime(s) from a location remote from the vehicle. The user/operator may also advantageously customize the vehicle chimes so that each chime is associated with a predetermined triggering event.

It is to be understood that, as defined herein, a user may include vehicle operators and/or passengers. Furthermore, the terms "connect/connected/connection," "engage/engaged/engagement/engageable," and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "engaged with" or "connected to" the other component is somehow in operative communication with the other component (notwithstanding the presence of one or more additional components therebetween). Additionally, two components may be permanently, semi-permanently, or releasably engaged with and/or connected to one another.

Figure 1:
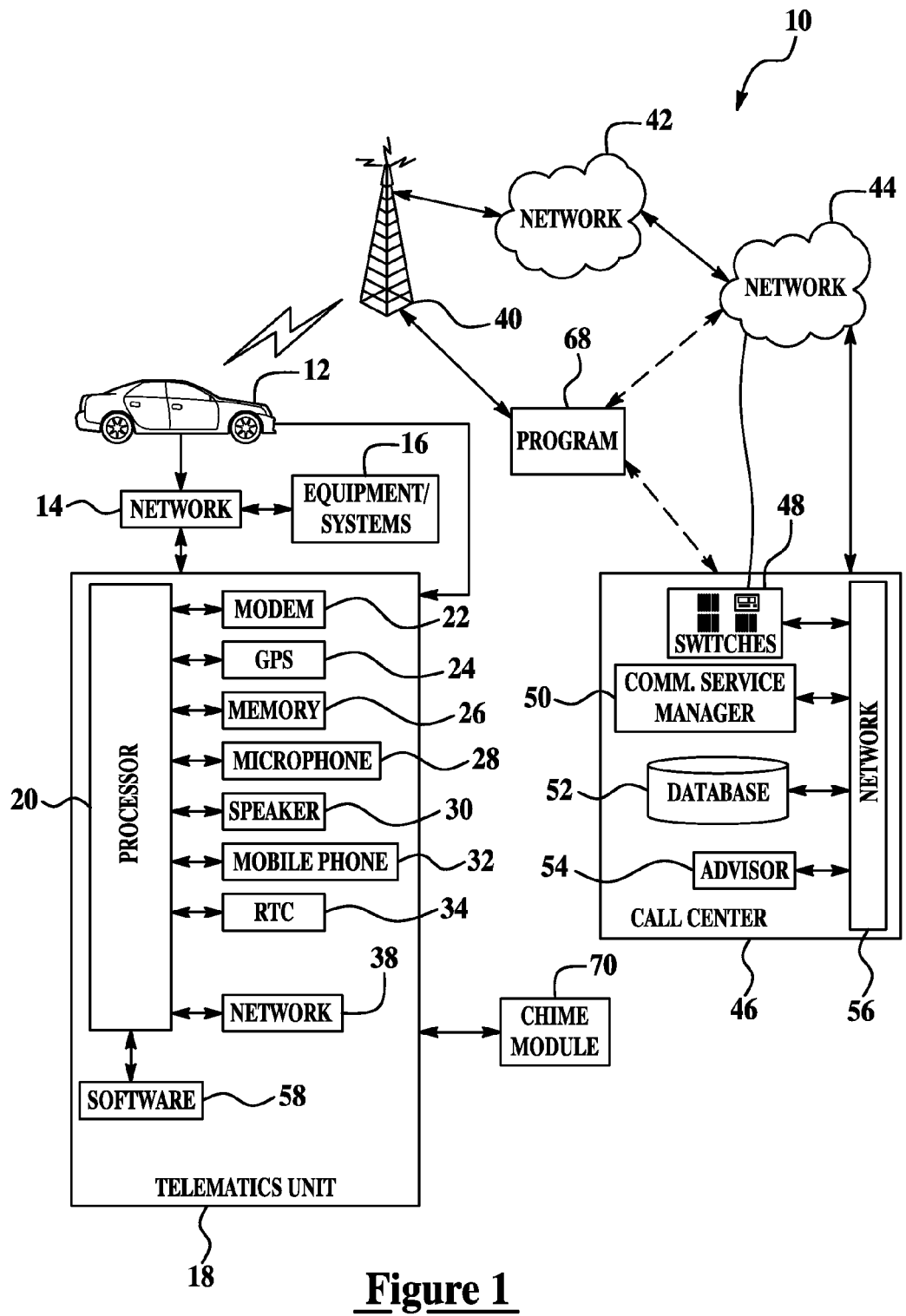
FIG. 1 is a schematic diagram depicting an embodiment of a system for realizing a preferred in-vehicle chime.

Referring now to FIG. 1, the system 10 includes a vehicle 12, a vehicle communications network 14, a telematics unit 18, a wireless communication system (including, but not limited to, one or more wireless carrier systems 40, one or more communication networks 42, and/or one or more land networks 44). In an embodiment, the wireless communication system is a two-way radio frequency communication system. In another embodiment, the wireless communication system also includes one or more call centers 46 and/or one or more Internet-enabled programs 68. In yet another embodiment, vehicle 12 is a mobile vehicle with suitable hardware and software for transmitting and receiving voice and data communications. System 10 may include additional components suitable for use in telematics units 18.

In an embodiment, via vehicle communications network 14, the vehicle 12 sends signals from the telematics unit 18 to various units of equipment and systems 16 within the vehicle 12 to perform various functions, such as unlocking a door, executing personal comfort settings, and/or the like. In facilitating interaction among the various communications and electronic modules, vehicle communications network 14 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 18 may send and receive radio transmissions from wireless carrier system 40. In an embodiment, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limitative example of which includes a Wide Area Network (WAN) transceiver), and/or combinations thereof.

Telematics unit 18 may include a processor 20 operatively coupled to a wireless modem 22, a location detection system 24 (a non-limitative example of which is a global positioning system (GPS)), an in-vehicle memory 26, a microphone 28, one or more speakers 30, an embedded or in-vehicle mobile phone 32, and/or a short-range wireless communication network 38 (e.g. a Bluetooth® unit).

It is to be understood that the telematics unit 18 may be implemented without one or more of the above listed components, such as, for example, speakers 30. Yet further, it is to be understood that the speaker 30 may be a component of the vehicle audio system, which may accept audio and other signals from the telematics unit 18. Telematics unit 18 may include additional components and functionality as desired for a particular end use.

Processor 20 may be a micro controller, a controller, a microprocessor, a host processor, and/or a vehicle communications processor. In another embodiment, processor 20 may be an application specific integrated circuit (ASIC). Alternatively, processor 20 may be a processor working in conjunction with a central processing unit (CPU) performing the function of a general-purpose processor.

Non-limiting examples of the location detection system 24 include a Global Position Satellite receiver, a radio triangulation system, a dead reckoning position system, and/or combinations thereof. In particular, a GPS provides accurate time and latitude and longitude coordinates of the vehicle 12 responsive to a GPS broadcast signal received from a GPS satellite constellation (not shown). In-vehicle mobile phone 32 may be a TTY compatible cellular type phone, such as, for example an analog, digital, dual-mode, dual-band, multi-mode and/or multi-band cellular phone.

Associated with processor 20 is a real time clock (RTC) 34 providing accurate date and time information to the telematics unit hardware and software components that may require date and time information. In one embodiment, date and time information may be requested from the RTC 34 by other telematics unit components. In other embodiments, the RTC 34 may provide date and time information periodically, such as, for example, every ten milliseconds.

Processor 20 may execute various computer programs that interact with operational modes of electronic and mechanical systems within the vehicle 12. It is to be understood that processor 20 controls communication (e.g. call signals) between telematics unit 18, wireless carrier system 40, call center 46, and Internet-enabled program 68.

Further, processor 20 may generate and accept digital signals transmitted between the telematics unit 18 and the vehicle communication network 14, which is connected to various electronic modules in the vehicle 12. In one embodiment, these digital signals activate the programming mode and operation modes within the electronic modules, as well as provide for data transfer between the electronic modules. In another embodiment, certain signals from processor 20 may be translated into vibrations and/or visual alarms.

It is to be understood that software 58 may be associated with processor 20 for monitoring and/or recording the incoming caller utterances.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 12 and the land network 44.

The land network 44 connects the communications network 40 to the call center 46 and/or the Internet-enabled program 68. In one embodiment, land network 44 is a public switched telephone network (PSTN). In another embodiment, land network 44 is an Internet Protocol (IP) network. In still other embodiments, land network 44 is a wired network, an optical network, a fiber network, another wireless network, and/or any combinations thereof. The land network 44 may be connected to one or more landline telephones. It is to be understood that the communications network 42 and the land network 44 connect the wireless carrier system 40 to the call center 46 and/or the Internet-enabled program 68.

Call center 46 contains one or more data switches 48, one or more communication services managers 50, one or more communication services databases 52 containing subscriber profile records and/or subscriber information, one or more communication services advisors 54, and one or more network systems 56. In an embodiment, the call center 46 may include a catalog of downloadable chimes. In a further embodiment, the call center 46 may be in communication with the Internet-enabled program 68 via any suitable wireless communication network and/or wired (e.g. land line(s)) communication network. It is to be understood that the telematics unit 18 may connect to a program at the call center 46 to access the downloadable chimes, and/or the telematics unit 18/user may connect with an advisor 54 to access downloadable chimes.

Switch 48 of call center 46 connects to land network 44. Switch 48 transmits voice or data transmissions from call center 46, and receives voice or data transmissions from telematics unit 18 in vehicle 12 through wireless carrier system 40, communications network 42, and land network 44. Switch 48 receives data transmissions from, or sends data transmissions to one or more communication service managers 50 via one or more network systems 56.

Call center 46 may contain one or more service advisors 54. In one embodiment, service advisor 54 may be human. In another embodiment, service advisor 54 may be an automaton.

The system 10 also includes an Internet-enabled program 68 that is operatively connected to at least the wireless carrier system 40. In an alternate embodiment, the Internet-enabled program 68 is directly operatively connected to the land network 44 or the call center 46 (illustrated by the phantom lines). It is to be understood that the telematics unit 18 may be in communication with the Internet-enabled program 68 via the wireless carrier system 40 alone, or in addition to the land network 44 and/or the call center 46.

Figure 2:
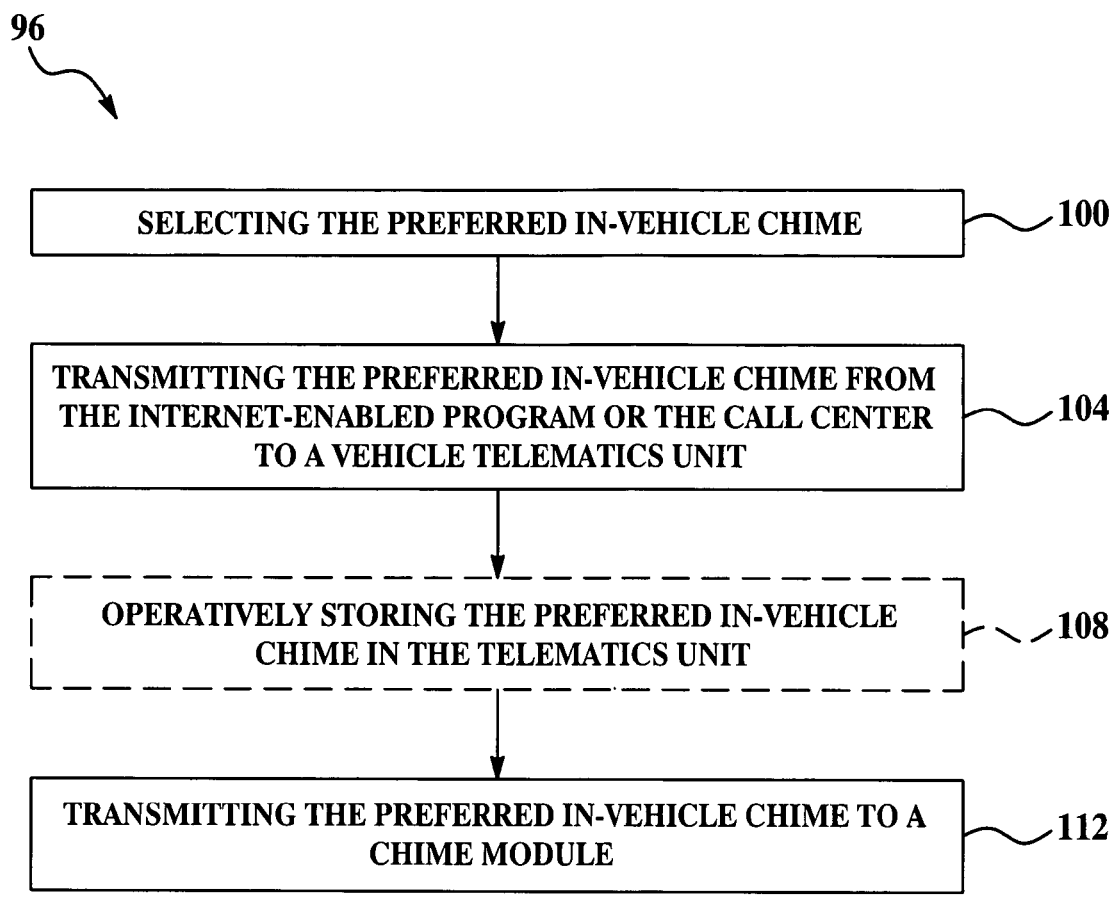
FIG. 2 is a flow diagram depicting an embodiment of a method for realizing a preferred in-vehicle chime.

Referring now to FIG. 2, a method 96 for realizing a preferred in-vehicle chime generally includes selecting the preferred in-vehicle chime from the Internet-enabled program 68 or the call center 46, as depicted at reference numeral 100. The preferred in-vehicle chime is then transmitted to the vehicle telematics unit 18, as depicted at reference numeral 104, where the chime is operatively stored, as depicted at reference numeral 108. The chime is then transmitted to the chime module, as depicted at reference numeral 112.

In an embodiment, selecting the preferred in-vehicle chime is accomplished by accessing the Internet-enabled program 68 and submitting a request for the preferred in-vehicle chime. It is to be understood that the Internet-enabled program 68 may be accessed via any device that is capable of connecting (wirelessly or with a wire) with the Internet. As a non-limiting example, the Internet-enabled program 68 may be accessed from a computer having an Internet connection. Furthermore, the Internet-enabled program 68 may be accessed, and thus the preferred in-vehicle chime may be selected, from a location that is remote from, or that is inside of, the vehicle 12.

The Internet-enabled program 68 may include a catalog of downloadable chimes whereby a user of the program 68 may browse and select one or more available chimes. The Internet-enabled program 68 may be an Internet website that includes the catalog of chimes. The Internet-enabled program 68 is also configured to receive a request from a user for a preferred in-vehicle chime. It is to be understood that two or more preferred in-vehicle chimes may be selected substantially simultaneously or sequentially. When a request for a preferred in-vehicle chime is made, it is to be understood that the user may have to input information about, for example, the vehicle 12, the desired chime, the triggering event to which the desired chime will be associated, or the like, or combinations thereof. In an embodiment, the user may set up an account with the Internet-enabled program 68 so that such information is stored, thereby simplifying the process when the user makes subsequent requests.

In another embodiment, selecting the preferred in-vehicle chime is accomplished by the user/telematics unit 18 submitting such a request to the call center 46. It is to be understood that the request may be in any suitable form, such as, for example, a button press or an utterance recognized via an interactive voice recognition (IVR) system.

A catalog of downloadable chimes may be presented to the user/subscriber in response to a request or a signal from the user/telematics unit 18; and/or the user may prefer as a chime an audio emission then-currently emanating from the vehicle sound system (e.g. from the radio), whereby the user may select a preferred chime by inputting another signal substantially simultaneous to or sequentially with hearing the preferred chime. It is to be understood that the selection may be in any suitable form, such as, for example, a button press or an utterance recognized via an interactive voice recognition (IVR) system.

In another embodiment, a catalog of downloadable chimes (or a portion thereof) may be transmitted to the telematics unit 18 and presented to the user therefrom. If a portion of a catalog of downloadable chimes is transmitted, the downloadable chimes included may be selected based upon recent download popularity or then-current season (such as, for example, Christmas jingles).

As previously stated, the request for the preferred in-vehicle chime may include identifying a triggering event for the preferred in-vehicle chime. Non-limitative examples of a triggering event for the preferred in-vehicle chime include key-in-the-ignition, exterior lamps on with ignition off, door ajar, safety restraints not fastened, low fuel, object in the vehicle path, device selected, and/or combinations thereof.

It is to be understood that the preferred in-vehicle chime may be triggered by any of the above non-limiting examples. Generally, the key-in-the-ignition chime may alert the user that the key remains in the ignition after the vehicle 12 has been turned off; the exterior lamps on with ignition off chime may alert the user that the exterior vehicle 12 lamps remain on when the key has been removed from the ignition or the vehicle 12 has been turned off; the door ajar chime may alert the user that a door is ajar during vehicle 12 operation or when the key is in the ignition; the safety restraints not fastened chime may alert the user that a vehicle occupant's safety restraint is not engaged during vehicle 12 operation or when the key is in the ignition; the low fuel chime may alert the user of a low fuel level; the object in the vehicle path chime may alert a user to objects in the vicinity of the vehicle 12 during vehicle 12 operation; and the device in use chime may sound when the user changes settings for in-vehicle features such as, for example, audio system options, video system options (e.g., DVD player), interior climate controls, and/or the like, and/or combinations thereof.

As previously stated, the system 10 for realizing a preferred in-vehicle chime may also include the vehicle telematics unit 18 operatively connected to the Internet-enabled program 68. In an embodiment of the method disclosed herein, the preferred in-vehicle chime may be transmitted from the Internet-enabled program 68 to the vehicle telematics unit 18. The request made using the Internet-enabled program 68 is processed, and the chime(s) is/are transmitted to the vehicle telematics unit 18 via the wireless communication system (e.g., the wireless carrier system 40, the land network 44, and/or the call center 46).

In an alternate embodiment, after the request for the preferred in-vehicle chime is operatively made after interfacing with the Internet-enabled program 68, the request and/or the file containing the preferred in-vehicle chime may then be transmitted to the call center 46 where it is received and/or analyzed. The call center 46 may then transmit the file containing the selected chime to the telematics unit 18 via the wireless communication system. The chime may be stored in the telematics unit 18 until it is ultimately transmitted via a communications bus to a chime module 70 (discussed further hereinbelow). It is to be understood that the chime module 70 may be located within and/or operatively controlled by the body control module (BCM). In an alternate embodiment, the telematics unit 18 itself may function as the chime module 70. In yet another alternate embodiment, the chime module 70 may be a stand-alone unit.

In another embodiment, after the request for the preferred in-vehicle chime is operatively made via the Internet-enabled program 68, the program 68 may analyze the request and transmit the chime via the wireless communication system to the telematics unit 18, and ultimately to the chime module 70.

As stated, the vehicle telematics unit 18 may operatively store the preferred in-vehicle chime. In an embodiment, the preferred in-vehicle chime may be operatively stored in the telematics unit 18 subsequent to transmitting the preferred in-vehicle chime to the vehicle 12 (e.g., the telematics unit 18) and prior to transmitting the preferred in-vehicle chime to the vehicle chime module 70. It is to be understood that the period of time for storing the chime module in the telematics unit 18 may range anywhere from seconds to days, depending, at least in part, on the state of the vehicle 12 during the request. For example, if the user requests the preferred chime, and then turns on the vehicle 12 within an hour of the request, the telematics unit 18 will store the chime for about 1 hour. In another example, if one user requests the preferred chime while another user is operating the vehicle 12, the telematics unit 18 may substantially simultaneously transmit the chime to the chime module 70.

The previously mentioned chime module 70 is shown in FIG. 1 as being a component of the vehicle 12 and operatively connected to and in communication with the telematics unit 18. The vehicle chime module 70 may receive the chime(s) from the telematics unit 18. The vehicle chime module 70 is capable of storing the preferred chime(s) indefinitely, or at least until a user replaces that particular preferred chime(s).

In an embodiment, the preferred in-vehicle chime is transmitted to the vehicle chime module 70 upon recognition of a signal. As a non-limitative example, the signal may be emitted upon initiation of a vehicle 12 ignition cycle. Thus, in this example embodiment, a user starts the vehicle 12, and upon initiation of an ignition cycle, a signal is sent which commands the telematics unit 18 to transmit the stored preferred chime to the vehicle chime module 70, which saves any new preferred chimes and/or updates and replaces previously stored chimes with the preferred chimes. In another embodiment, during vehicle 12 operation, the user may provide a signal to the telematics unit 18 via any suitable means, such as, for example, a button press or an utterance into an interactive voice recognition (IVR) system. In yet another embodiment, the signal may be initiated via a polling method, such as, for example, checking for a chime download event at predetermined intervals.

As indicated, the selected preferred in-vehicle chime(s) may replace previously stored in-vehicle chime(s). In an embodiment, two or more different preferred in-vehicle chimes may be selected, and the vehicle chime module 70 is capable of transmitting one of the preferred in-vehicle chimes to replace one of the previously stored chimes and transmitting the second of the preferred in-vehicle chimes to replace a second of the previously stored chimes. As a non-limitative example, a user may request/select a preferred in-vehicle door ajar chime and a preferred in-vehicle low fuel chime. The chimes are both transmitted to the vehicle telematics unit 18. In this example, when the preferred chimes are transmitted from the telematics unit 18 to the chime module 70, the preferred in-vehicle door ajar chime replaces a previously stored in-vehicle door ajar chime, and the preferred in-vehicle low fuel chime replaces a previously stored in-vehicle low fuel chime.

In an embodiment, the vehicle 12 has a vehicle audio system in communication with the vehicle chime module 70. It is to be understood that upon the occurrence of a triggering event, the preferred chime for that event may be audibly emitted via the vehicle audio system. The chime module 70 may also be configured (either in addition to or instead of the vehicle audio system) to emit the preferred vehicle chime(s).

While several embodiments have been described in detail, it will be apparent to those skilled in the art that the disclosed embodiments may be modified. Therefore, the foregoing description is to be considered exemplary rather than limiting.

The invention claimed is:

1. A method for realizing a preferred in-vehicle chime, comprising:
    selecting the preferred in-vehicle chime from at least one of an Internet-enabled program or a call center;
    transmitting a catalog of chimes including the preferred in-vehicle chime from the at least one of the Internet-enabled program or the call center directly to a telematics unit operatively disposed within the vehicle;
    storing, in the telematics unit, the catalog of chimes transmitted from the at least one of the Internet-enabled program or the call center; and
    in response to a signal, transmitting the preferred in-vehicle chime from the telematics unit to a vehicle chime module operatively disposed within the vehicle.

2. The method of claim 1 wherein the at least one of the Internet-enabled program or the call center includes the catalog of chimes from which the preferred in-vehicle chime may be selected.

3. The method of claim 1 wherein selecting the preferred in-vehicle chime is accomplished by:
    accessing the at least one of the Internet-enabled program or the call center; and
    submitting a request for the preferred in-vehicle chime.

4. The method of claim 3 wherein the request includes identifying a triggering event for the preferred in-vehicle chime.

5. The method of claim 4, further comprising:
    setting up an account with the Internet-enabled program; and
    storing information in the account, the stored information related to at least one of a vehicle, the preferred in-vehicle chime or the triggering event associated with the preferred in-vehicle chime.

6. The method of claim 1 wherein selecting the preferred in-vehicle chime is performed in a location remote from the vehicle.

7. The method of claim 1 wherein the signal is emitted in response to recognition of a vehicle ignition cycle.

8. The method of claim 1 wherein transmitting the preferred in-vehicle chime to the vehicle chime module replaces a previously stored in-vehicle chime with the preferred in-vehicle chime.

9. The method of claim 8 wherein at least two different preferred in-vehicle chimes are selected, wherein transmitting one of the at least two different preferred in-vehicle chimes to the vehicle chime module replaces a first previously stored in-vehicle chime, and wherein transmitting an other of the at least two different preferred in-vehicle chimes to the vehicle chime module replaces a second previously stored in-vehicle chime.

10. The method of claim 1 wherein the preferred in-vehicle chime is adapted to sound in response to a triggering event selected from key-in-the-ignition, exterior lamps on with ignition off, door ajar, safety restraints not fastened, low fuel, object in vehicle path, device selected, and combinations thereof.

11. The method as defined in claim 1 wherein the telematics unit is in communication with the at least one of the Internet-enabled program or the call center via a wireless carrier system.

12. The method as defined in claim 11 wherein the call center is in communication with the Internet-enabled program via a land line.

13. A system for realizing a preferred in-vehicle chime, comprising:
    an Internet-enabled program including a catalog of downloadable chimes, the Internet-enabled program adapted to receive a request for the preferred in-vehicle chime;
    a vehicle telematics unit operatively connected to the Internet-enabled program via a wireless carrier system, the vehicle telematics unit capable of receiving the catalog of downloadable chimes including the preferred in-vehicle chime directly from the Internet-enabled program; and
    a vehicle chime module operatively connected to the vehicle telematics unit, the vehicle chime module adapted to i) receive a transmission of the catalog of downloadable chimes from the telematics unit in response to a signal, and ii) store the catalog of downloadable chimes therein.

14. The system of claim 13, further comprising a vehicle audio system in communication with the vehicle chime module, the vehicle audio system configured to audibly emit the preferred in-vehicle chime.

15. The system of claim 13 wherein the Internet-enabled program is accessible via a computer.

16. The system of claim 13 wherein the preferred in-vehicle chime is adapted to sound in response to a triggering event selected from key-in-the-ignition, exterior lamps on with ignition off, door ajar, safety restraints not fastened, low fuel, an object in vehicle path, a device selected, and combinations thereof.

17. A method for realizing a preferred in-vehicle chime, the method comprising:
    selecting the preferred in-vehicle chime from a catalog of chimes via an Internet-enabled program;
    transmitting the catalog of chimes including the preferred in-vehicle chime from the Internet-enabled program directly to a vehicle telematics unit via a wireless carrier system;

operatively storing the preferred in-vehicle chime in the telematics unit; and transmitting, upon recognition of a signal, the preferred in-vehicle chime to a vehicle chime module.

18. The method of claim 17 wherein transmitting the preferred in-vehicle chime to a vehicle chime module replaces a previously stored in-vehicle chime with the preferred in-vehicle chime.

19. The method of claim 17 wherein the signal is emitted upon initiation of an ignition cycle.

20. The method of claim 17 wherein the vehicle chime module is in communication with a vehicle audio system, and wherein at least one of the vehicle chime module, the vehicle audio system, or combinations thereof is configured to audibly emit the preferred in-vehicle chime.

21. The method of claim 20, further comprising audibly emitting the preferred in-vehicle chime in response to a triggering event selected from key-in-the-ignition, exterior lamps on with ignition off, door ajar, safety restraints not fastened, low fuel, object in vehicle path, device selected, and combinations thereof.

* * * * *